United States Patent [19]

Moncton et al.

[11] Patent Number: 5,978,886
[45] Date of Patent: *Nov. 2, 1999

[54] METHOD AND APPARATUS FOR DUPLICATING TAG SYSTEMS TO MAINTAIN ADDRESSES OF CPU DATA STORED IN WRITE BUFFERS EXTERNAL TO A CACHE

[75] Inventors: Julie W. Moncton, Cupertino; Kenneth K. Chan, Saratoga, both of Calif.

[73] Assignee: Hewlett-Packard Company, Palo Alto, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/785,371

[22] Filed: Jan. 17, 1997

[51] Int. Cl.⁶ .............................. G06F 13/00; G06F 12/12
[52] U.S. Cl. ......................... 711/118; 711/141; 711/146; 711/144
[58] Field of Search ..................................... 711/118, 141, 711/143, 144, 145, 146

[56] References Cited

U.S. PATENT DOCUMENTS

| | | | |
|---|---|---|---|
| 4,349,871 | 9/1982 | Lary ........................................... | 711/138 |
| 4,392,200 | 7/1983 | Arulpragasam et al. ................ | 711/140 |
| 5,226,146 | 7/1993 | Milia et al. ............................... | 711/141 |
| 5,319,766 | 6/1994 | Thaller et al. ........................... | 711/146 |
| 5,537,575 | 7/1996 | Foley et al. .............................. | 711/141 |
| 5,559,987 | 9/1996 | Foley et al. .............................. | 711/144 |
| 5,581,729 | 12/1996 | Nishtala et al. ......................... | 711/143 |
| 5,590,310 | 12/1996 | Willenz et al. .......................... | 711/146 |
| 5,737,757 | 4/1998 | Hassoun et al. ......................... | 711/145 |

*Primary Examiner*—Glenn Gossage

[57] ABSTRACT

An apparatus and method for duplicating tag addresses to maintain addresses of central processing unit (CPU) data stored in write buffers external to a cache are disclosed. Advance notification of write transactions is issued to allow a subsystem that maintains duplicate cache tags to know in advance which write transactions are present in the CPU's buffers. Such information is used to keep duplicate tags for both the cache and any buffers that contain writes that are to be removed from the cache. The cache is preferably a direct mapped cache and the CPU preferably resides within a multiprocessor architecture. In the preferred embodiment, all write transactions are indirectly caused by a read transaction that is about to bring a line into the cache. Thus, a read transaction is issued by the CPU before the write transaction is issued. A field is added to the read transaction that indicates whether or not the read transaction has a corresponding line that must be written out of the cache and into a buffer, such that the duplicate tags duplicate both the CPU cache and the CPU write buffers.

13 Claims, 3 Drawing Sheets

METHOD AND APPARATUS FOR DUPLICATING TAG SYSTEMS TO MAINTAIN ADDRESSES OF CPU DATA STORED IN WRITE BUFFERS EXTERNAL TO A CACHE

BACKGROUND OF THE INVENTION

1. Technical Field

The invention relates to a computer architecture, including a uniprocessor architecture having a cache and a multiprocessor architecture. More particularly, the invention relates to maintaining cache coherency in a uniprocessor or multiprocessor computer architecture.

2. Description Of The Prior Art

Caches can be classified either as write-through or write-back. A write-through cache is always written to along with system memory, such that system memory and cache each maintain a current copy of the information that is written, and the possibility of stale data is avoided. Information input in computer architecture using a write-through cache requires significant system overhead. For example, the system must guarantee that none of the blocks of the input/output (I/O) buffer that have been designated for input are in the cache.

Write-back caches keep modified data until the data are cast out and written back to memory to make room for new data. Because a write-back cache may have the only copy of modified data, special care must be taken in the cache coherency protocol between multiple caches such that the cache data can be quickly accessed and never lost.

The protocols that are used to maintain coherency for multiple processors are referred to as cache coherency protocols. There are two classes of cache coherency protocols:

1. Directory based: The information about one block of physical memory is kept in just one location. This information usually includes which cache(s) has a copy of the block and whether that copy is marked exclusive for future modification. An access to a particular block first queries the directory to see if the memory data is stale and the real data resides in some other cache. If it is, then the cache containing the modified block is forced to return its data to memory. Then the memory forwards the data to the new requester, updating the directory with the new location of that block. This protocol minimizes inter-bus module (or inter-cache) disturbance, but typically suffers from high latency and is expensive to build due to the large directory size required.

2. Snooping: Every cache that has a copy of the data from a block of physical memory also has a copy of the information about the data block. Each cache is typically located on a shared memory bus, and all cache controllers monitor or snoop on the bus to determine whether or not they have a copy of the shared block.

Snooping protocols are well suited for multiprocessor system architectures that use caches and shared memory because they operate in the context of the preexisting physical connection usually provided between the bus and the memory. Snooping is preferred over directory protocols because the amount of coherency information is proportional to the number of blocks in a cache, rather than the number of blocks in main memory.

The coherency problem arises in a multiprocessor architectures when a processor must have exclusive access to write a block of memory or object, and/or must have the most recent copy when reading an object. A snooping protocol must locate all caches that share the object to be written. The consequences of a write to shared data are either to invalidate all other copies of the data, or to broadcast the write to all of the shared copies. Because of the use of write back caches, coherency protocols must also cause checks on all caches during memory reads to determine which processor has the most up to date copy of the information.

Data concerning information that is shared among the processors is added to status bits that are provided in a cache block to implement snooping protocols. This information is used when monitoring bus activities. On a read miss, all caches check to see if they have a copy of the requested block of information and take the appropriate action, such as supplying the information to the cache that missed. Similarly, on a write, all caches check to see if they have a copy of the data, and then act, for example by invalidating their copy of the data, or by changing their copy of the data to the most recent value.

Because every coherent bus transaction causes the caches to check their address tags, snooping interferes with the central processing unit (CPU)'s access to its cache regardless of the snoop result. For example, even when snooping returns a miss, the CPU is prevented from cache access because the cache is unavailable, i.e. the cache is busy checking tags to match against the snoop address. Thus, the CPU stalls or locks if it needs to access the cache while the cache is busy with a coherency check.

Snooping protocols are of two types:

Write invalidate: The writing processor causes all copies in other caches to be invalidated before changing its local copy. The processor is then free to update the data until such time as another processor asks for the data. The writing processor issues an invalidation signal over the bus, and all caches check to see if they have a copy of the data. If so, they must invalidate the block containing the data. This scheme allows multiple readers but only a single writer.

Write broadcast: Rather than invalidate every block that is shared, the writing processor broadcasts the new data over the bus. All copies are then updated with the new value. This scheme continuously broadcasts writes to shared data, while the write invalidate scheme discussed above deletes all other copies so that there is only one local copy for subsequent writes. Write broadcast protocols usually allow data to be tagged as shared (broadcast), or the data may be tagged as private (local). For further information on coherency, see J. Hennessy, D. Patterson, Computer Architecture: A Quantitative Approach, Morgan Kaufmann Publishers, Inc. (1990).

In a snoopy coherence multiprocessor system architecture, each coherent transaction on the system bus is forwarded to each processor's cache subsystem to perform a coherency check. This check usually disturbs the processor's pipeline because the cache cannot be accessed by the processor while the coherency check is taking place.

In a traditional, single ported cache without duplicate cache tags, the processor pipeline is stalled on cache access instructions when the cache controller is busy processing cache coherency checks for other processors. For each snoop, the cache controller must first check the cache tags for the snoop address, and then modify the cache state if there is a hit. Allocating cache bandwidth for an atomic (unseparable) tag read and write (for possible modification) locks the cache from the processor longer than needed if the snoop does not require a tag write. For example, 80% to 90% of the cache queries are misses, i.e. a tag write is not required.

It is possible to eliminate contention between the processor pipeline and the bus snoops by implementing a dual ported cache. However, this solution requires additional hardware and interconnect, and is therefore difficult and expensive to implement.

In multi-processor systems, duplicate tags (which are also referred to as "tag caches") may be used to minimize the number of coherence checks performed on a processor. For such duplicate tags to function, it is important that the duplicate tags each include all cache lines owned by an associated CPU. One challenge of maintaining duplicate tags is to make sure that they include not only the CPU caches, but also any buffers that may be temporarily holding cache lines about to be written out by the CPU.

Prior art solutions to this problem include forcing out the write of a cache line before it is replaced by another cache line. For example, a CPU "A" must issue a write for a line "X" before it is allowed to cache a line "Y." One disadvantage of this solution is that it can decrease system performance. CPUs must process cache misses as quickly as possible to optimize performance. The amount of time required to write out dirty cache lines is not critical to overall system performance. By forcing the CPU to wait until the write has been issued before it can complete the cache miss, this prior art approach adds latency to the cache miss penalty which, in turn, slows down overall CPU performance.

A system implementing a mechanism that maintains duplicate tags to make sure that they include not only the CPU caches, but also any buffers that may be temporarily holding cache lines about to be written out by the CPU, in a simple and inexpensive way would be a significant advance in multiprocessor architecture design.

SUMMARY OF THE INVENTION

The invention provides a method and apparatus that issues advance notification of write transactions. This allows a subsystem that maintains duplicate cache tags to know in advance which write transactions a represent in the CPU's buffers. Such information is used to keep duplicate tags for both the cache and any write buffers that contain writes that are to be removed from the cache.

DETAILED DESCRIPTION OF THE INVENTION

In prior art duplicate tag systems, it was necessary for a line (e.g. Line "X") to be written out of the CPU's write buffer before another line (e.g. Line "A") could be placed into the c ache because the subsystem only maintained duplicate tags for the contents of the data cache and not for the contents of the write buffers. In contrast thereto, the duplicate tag subsystem described herein provides matching entries for the write buffer. Thus, for an eight-entry write buffer there are eight matching entries in the duplicate write buffer.

Figure 1:
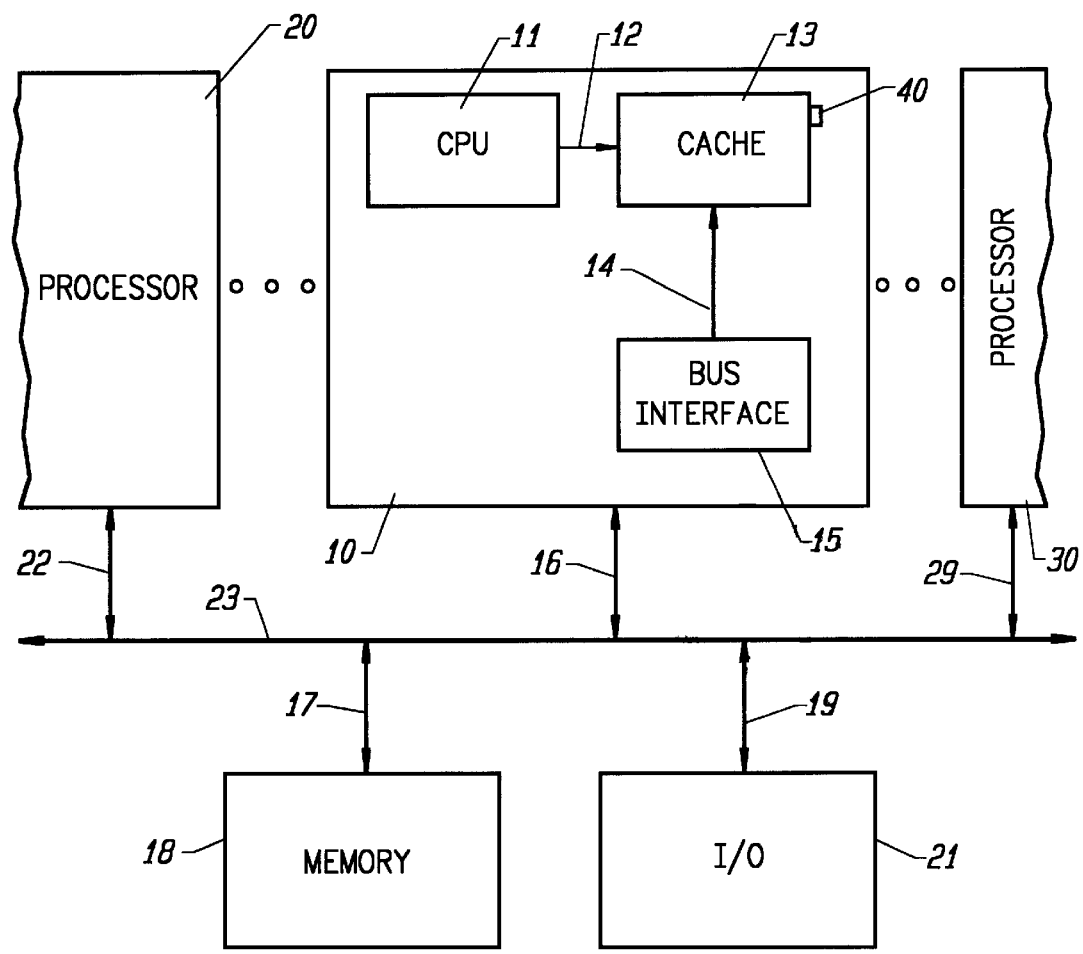
FIG. 1 is a block schematic diagram of an exemplary multiprocessor computer architecture.

FIG. 1 is a block schematic diagram of an exemplary multiprocessor computer architecture. In a multiprocessor computer architecture, a plurality of modules, such as processors 10, 20, 30 are coupled to a system bus 23 by bus links 16, 22, 29, respectively. Any number of processors may be used in such architecture, depending upon processor speed and operating system design. Each processor has an internal structure that includes a central processing unit ("CPU") 11 which is coupled via an internal link 12 to a processor cache memory 13. The processor cache memory includes a cache line 40 that consists of address tags, status, and data components. A bus interface module 15 couples the processor cache to the system bus 23 by an internal bus link 14 and a processor bus link 16. The processors are adapted to communicate with each other; with a system memory 18, which is coupled to the system bus 23 by a bus link 17; and with a system input/output ("I/O") module 21 which is coupled to system bus 23 by a bus link 19.

It should be appreciated that the specific system and processor architectures that are described herein are discussed for purposes of example, and they are not intended to be construed as limitation upon the scope of the invention, which is defined by the claims below. The invention is well adapted for many different types of processors, cache structures, and multiprocessor architecture.

Whenever a coherent transaction is issued on the bus 23, each processor 10, 20, 30, acting as a third party, performs a cache coherency check using a virtual index and real address. The invention also has application to systems using physically indexed caches.

Each third party processor is responsible for signaling cache coherency status after the address cycle. The third party processor signals that its cache line 40 is in one of four states: shared, private clean (or "exclusive"), private dirty (or "modified"), or not present (or "invalid"). The requesting processor interprets the coherency status to determine how to mark the cache line, i.e. private clean, private dirty, or shared. The third party also updates its cache line state to indicate: no change, shared, or not present.

If a third party signals that it has the requested line in the private dirty state, then it initiates a cache to cache transaction at a time after the address cycle. The requesting processor discards the data received from main memory for the initial request and instead accepts the data directly from the third party in a cache to cache transfer. At the same time, the data from the third party is written to main memory. Because a multiprocessor system architecture allows multiple outstanding pipeline transactions, it is important that the processor modules be able to perform pipeline cache coherency checks to take maximum advantage of the bus bandwidth. For a discussion of a multiprocessor system architecture of the type with which the invention finds ready application, see K. Chan, T. Alexander, C. Hu, D. Larson, N. Noordeen, Y. Van Atta, T. Wylegala, S. Ziai, *Multiprocessor Features of the HP Corporate Business Servers*, Compcon Digest of Papers (February 1993).

The invention provides a method and apparatus that issues advance notification of write transactions. This allows a subsystem that maintains duplicate cache tags to know in advance which write transactions are present in the CPU's buffers. Such information is used to keep duplicate tags for both the cache and any buffers that contain writes that are to be removed from the cache.

The invention provides each CPU the freedom of not coupling the read transaction for a cache miss with the write transaction caused by removing a dirty victim line. Because CPU performance is determined by the speed at which reads can be issued and completed, and not by that of write transactions, this approach provides a significant improvement in system performance. The invention is especially useful in systems that have duplicate tags maintained in a subsystem, or integrated circuit, that is separate from that of the CPU.

Figure 2:
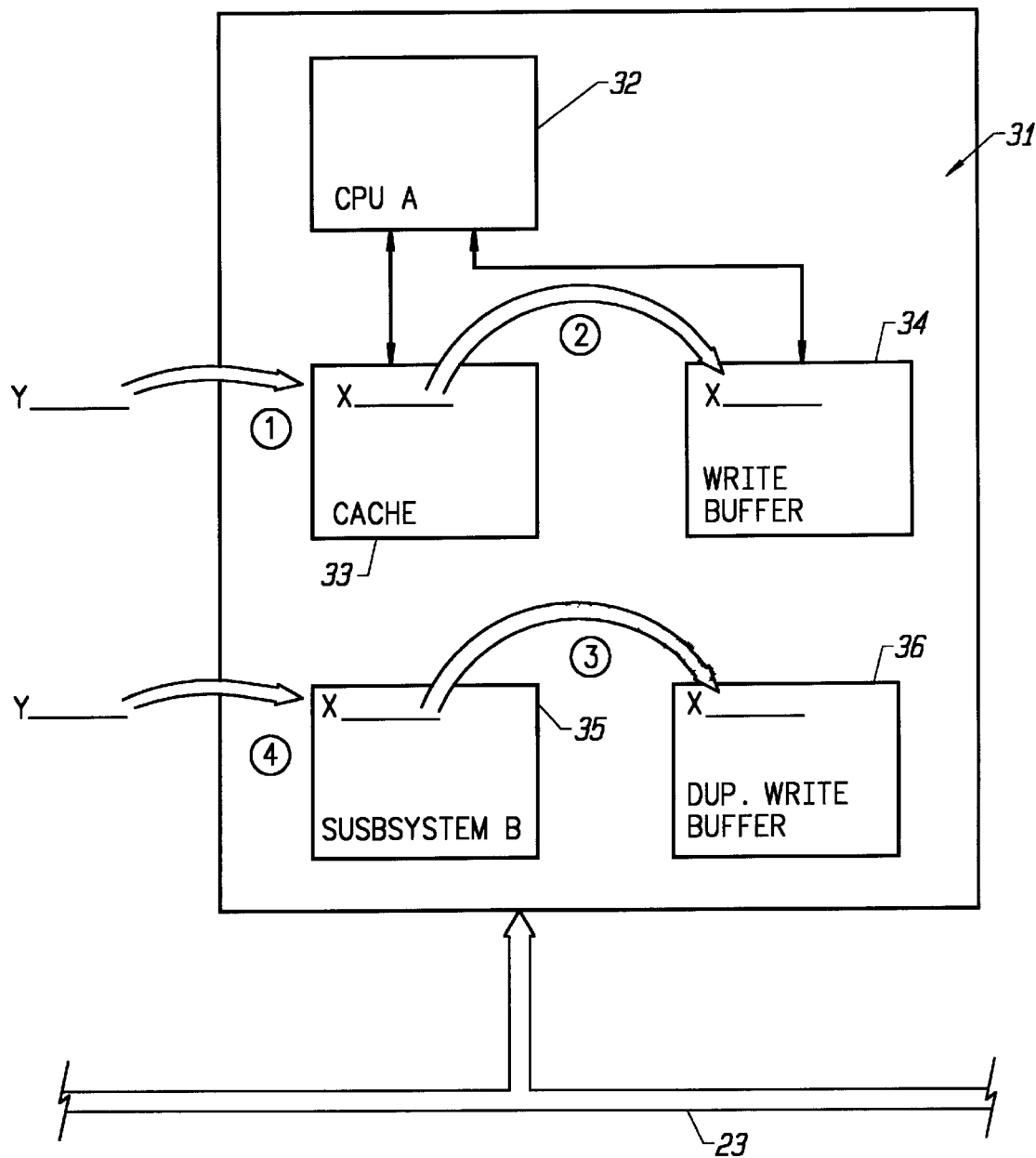
FIG. 2 is a block schematic diagram showing a system for duplicating cache tag systems to maintain addresses of CPU data stored in write buffers external to a cache according to the invention.

FIG. 2 is a block schematic diagram that illustrates the operation of the invention. As shown in the figure, a system 31 comprises a CPU "A" 32 that has associated therewith a direct mapped cache 33. The system is one system of a multiprocessor architecture and it is configured to communicate with other processors in the architecture via a bus 23.

For example, a line "X" in the cache is dirty. The CPU "A" wants to replace line "X" with a new line, i.e. line "Y." This is shown in the figure by the arrow that is identified by the encircled number (1). The CPU "A" replaces line "X" with line "Y" in the cache and places line "X" in a write buffer 34. This is shown in the figure by the arrow that is identified by the encircled number (2).

A subsystem "B" 35 includes a cache that maintains duplicate tags for CPU "A." When line "X" is in the cache, the duplicate tags contain line "X." When line "Y" is moved into the cache, the duplicate tags for the write buffer, i.e. the duplicate write buffer 36, contain line "X." This is shown in the figure by the arrow that is identified by the encircled number (3). The duplicate tags for the cache contain line "Y." This is shown in the figure by the arrow that is identified by the encircled number (4).

In a system having a write back cache, lines are written from the cache when they are dirty and the cache entry is needed for another line. Thus, all write transactions are indirectly caused by a read transaction that is about to bring a line into the cache. This ends up throwing another line out of the cache.

For performance reasons, the read transaction is usually issued by the CPU before the write transaction is issued. A key feature of the invention is the addition of a field to the read transaction that indicates whether or not the read transaction has a corresponding line that must be written out of the cache and into a buffer. This new field permits the duplicate tag subsystem to duplicate both the cache and the CPU write buffers.

Figure 3:
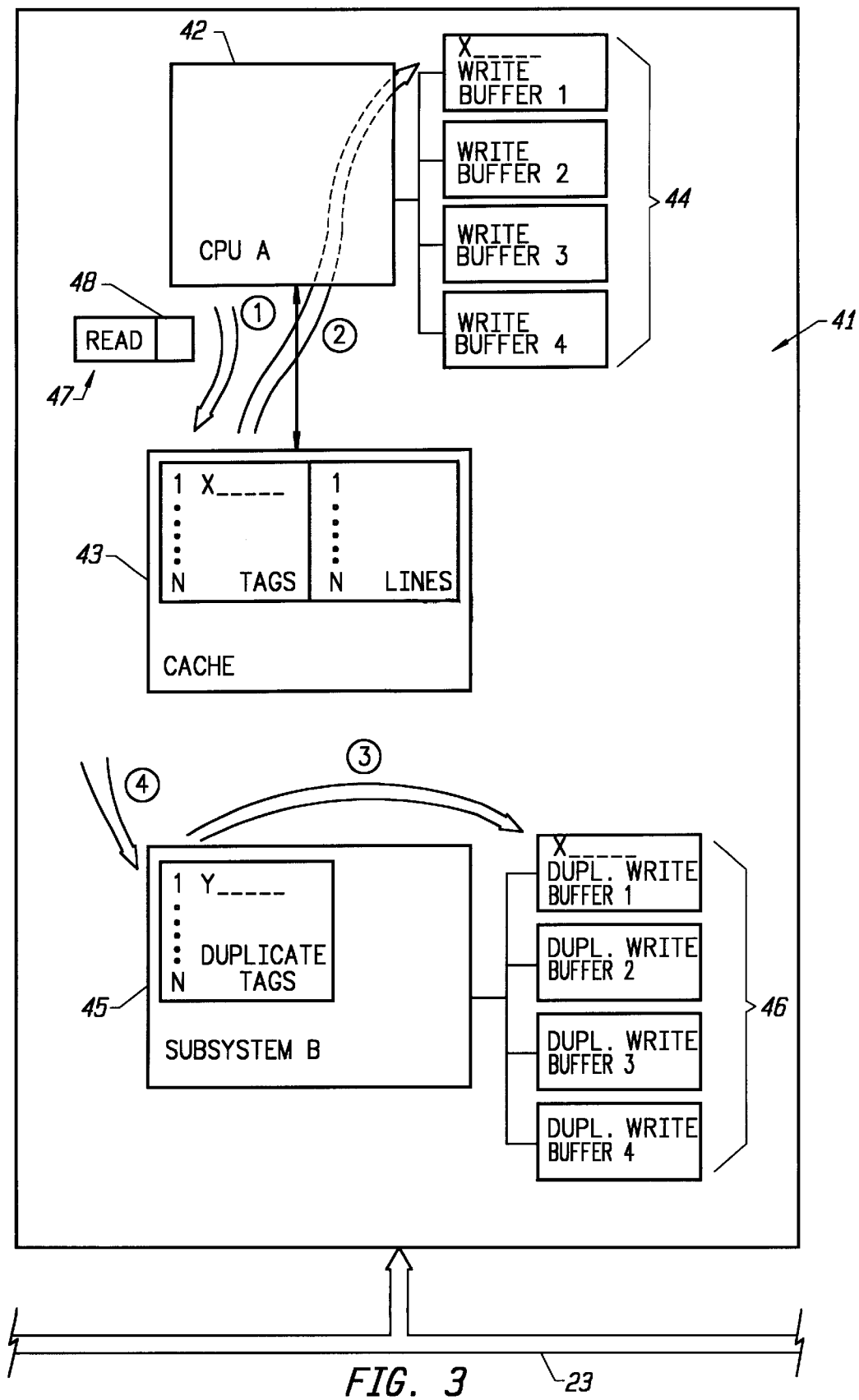
FIG. 3 is a block schematic diagram that illustrates an example of the use of duplicate write buffers in accordance with the invention.

FIG. 3 is a block schematic diagram that illustrates an example of the use of duplicate write buffers in accordance with the invention. A system 41 comprises a CPU "A" 42 that has associated therewith a direct mapped cache 43. The CPU "A" also has associated therewith four write buffers 44 that hold writes from the cache until the writes can be issued. The system is one system of a multiprocessor architecture and it is configured to communicate with other processors in the architecture via a bus 23.

A subsystem "B" 45 has duplicate tags for the direct mapped cache 43. There is a duplicate tag entry for every cache line. The subsystem "B" also has four duplicate write buffers 46 that bear a one-to-one correspondence to the CPU's four write buffers 44.

The CPU "A" has line "X" in the cache 43. Line "X" is dirty. The CPU "A" wants to bring line "Y" into the cache. Line "Y" indexes to the same location in the cache as line "X." Bringing line "Y" into the cache forces line "X" into one of the write buffers. To bring line "Y" into the cache, CPU "A" issues a read "Y" transaction 47 on the bus, with an indication that there is to be a write transaction because of this read, i.e. via a field 48 to the read transaction 47 that indicates whether or not the read transaction has a corresponding line that must be written out of the cache and into a buffer. This is shown in the figure by the arrow that is identified by the encircled number (1).

After the read transaction is complete, the CPU "A" has line "Y" in the cache and line "X" in the write buffer. This is shown in the figure by the arrow that is identified by the encircled number (2).

The subsystem "B" has a line "X" in its duplicate tags. The subsystem "B" sees the read transaction 47 for line "Y." Because the read transaction includes an indication that there is a write associated with this read, the Subsystem "B" moves line "X" from the duplicate tags into one of the duplicate write buffers for the CPU write buffers. This is shown in the figure by the arrow that is identified by the encircled number (3).

The Subsystem "B" then updates the duplicate cache tags to include line "Y." This is shown in the figure by the arrow that is identified by the encircled number (4). After the read transaction has been issued, the duplicate tags contain an entry in the duplicate cache tags for line "Y" and an entry in the duplicate write buffer tags for line "X." Thus, the Subsystem "B" has correctly updated its duplicate tags to include a correct copy of the CPU "A" cache and the write buffer contents.

The following are considerations to be taken into account when implementing the preferred embodiment of the invention:

The duplicate tag subsystem should preferably have the same number of entries in its duplicate cache tag as there are in the cache. Such subsystem should also have the same number of entries in its duplicate write buffer as there are in the CPU write buffers. This arrangement guarantees that the duplicate tag subsystem can provide a tag for every line of data owned by the CPU.

The duplicate tag subsystem should use the same replacement algorithm for the duplicate cache tag as the CPU uses for its cache. This allows the duplicate tag subsystem to know which entry of the cache is moved into the write buffer. In this way, the subsystem can move the correct entry from the duplicate cache tag into the duplicate write buffer.

The duplicate tag subsystem should use the same replacement algorithm for the duplicate write buffer as the CPU uses to replace entries in its write buffers. Thus, if all entries of the write buffers are used by the CPU, the duplicate tag subsystem knows which write entry is to be replaced.

Although the invention is described herein with reference to the preferred embodiment, one skilled in the art will readily appreciate that other applications may be substituted for those set forth herein without departing from the spirit and scope of the present invention. Accordingly, the invention should only be limited by the claims included below.

We claim:

1. A method for maintaining duplicate addresses of data associated with a central processing unit (CPU), where said data are stored in at least one CPU write buffer, comprising the steps of:

issuing a read transaction including a field that indicates whether or not the read transaction has a corresponding line that must be written out of a cache and into said at least one CPU write buffer to provide advance notification of write transactions; and maintaining duplicate tags in a duplicate tag subsystem for both said cache and said at least one CPU write buffer if said at least one CPU write buffer contains writes that are to be removed from said cache, wherein said duplicate tags are maintained external to said cache.

2. The method of claim 1, wherein all write transactions are indirectly caused by a read transaction that is about to bring a line into said cache.

3. The method of claim 1, further comprising the steps of:

providing the same number of entries in said duplicate tag subsystem as there are in the cache; and providing the same number of entries in a duplicate CPU write buffer as there are in said at least one CPU write buffer;

wherein said duplicate tag subsystem provides a tag for every line of data owned by said CPU.

4. The method of claim 1, further comprising the step of:

using a same replacement algorithm for the duplicate cache tags as said CPU uses for said cache;

wherein said duplicate tag subsystem knows which entry of said cache is moved into said at least one CPU write buffer; and wherein said duplicate tag subsystem can move a correct entry from the duplicate cache tags into a duplicate CPU write buffer.

5. The method of claim 1, further comprising the step of:

using a same replacement algorithm for a duplicate write buffer as said CPU uses to replace entries in said at least one CPU write buffer;

wherein said duplicate tag subsystem knows which write entry is to be replaced if all entries of said at least one CPU write buffer are used by said CPU.

6. An apparatus for maintaining duplicate addresses of data stored in at least one central processing unit (CPU) write buffer, comprising:

a CPU for issuing a read transaction including a field that indicates whether or not the read transaction has a corresponding line that must be written out of a cache and into said at least one CPU write buffer to provide advance notification of write transactions;

a cache coupled to said CPU; and a duplicate tag subsystem for maintaining duplicate tags for both said cache and for said at least one CPU write buffer, if said at least one CPU write buffer contains writes that are to be removed from said cache, wherein said duplicate tags are maintained external to said cache.

7. The apparatus of claim 6, wherein said CPU resides within a multiprocessor architecture.

8. The apparatus of claim 6, said read transaction comprising:

a field that indicates whether or not said read transaction has a corresponding line that must be written out of said cache and into said at least one write CPU buffer;

wherein said duplicate tags duplicate both said cache and said at least one CPU write buffer.

9. The apparatus of claim 6, wherein there is a same number of entries in said duplicate tag subsystem as there are in the cache, and the same number of entries in a duplicate write buffer as there are in said at least one CPU write buffer; and wherein said duplicate tag subsystem provides a tag for every line of data owned by said CPU.

10. The apparatus of claim 6, wherein a replacement algorithm used for the duplicate cache tags is the same as an algorithm said CPU uses for said cache;

wherein said duplicate tag subsystem knows which entry of said cache is moved into said at least one CPU write buffer; and wherein said subsystem can move a correct entry from the duplicate cache tags into a duplicate write buffer.

11. The apparatus of claim 6, wherein a replacement algorithm used for a duplicate write buffer is the same as an algorithm said CPU uses to replace entries in said at least one CPU write buffer;

wherein said duplicate tag subsystem knows which write entry is to be replaced if all entries of said at least one CPU write buffer are used by said CPU.

12. The apparatus of claim 6, wherein said cache is a write back cache.

13. The apparatus of claim 12, wherein all said write transactions are indirectly caused by a read transaction that is about to bring a line into said cache.

* * * * *